UNITED STATES PATENT OFFICE.

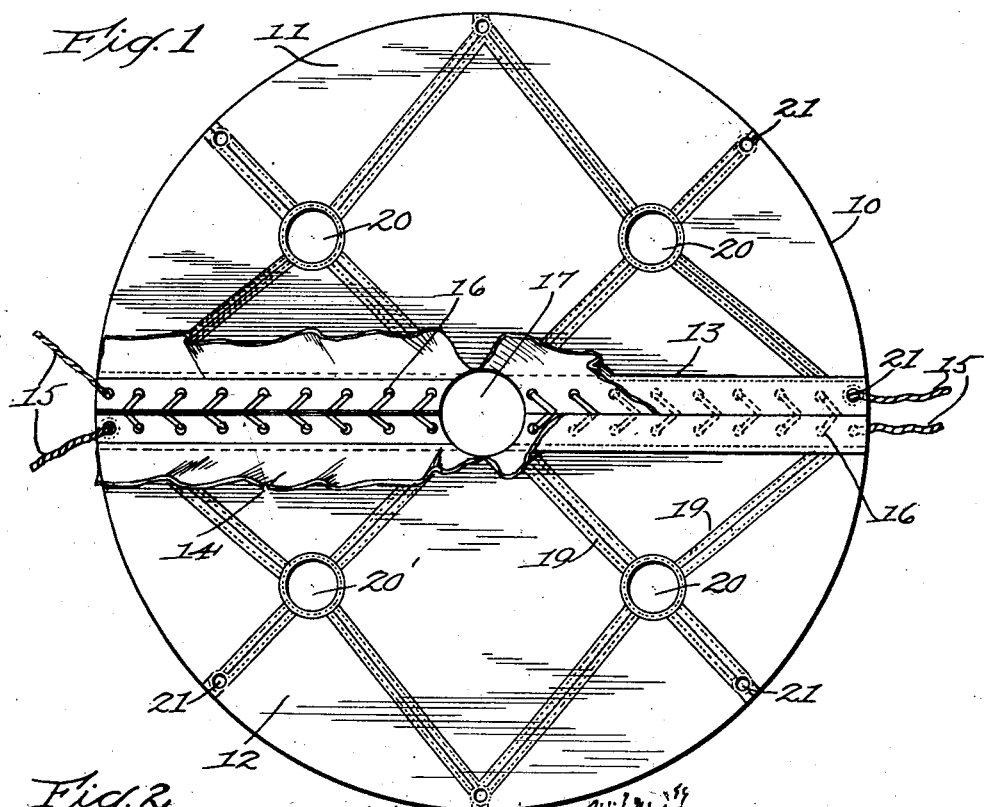
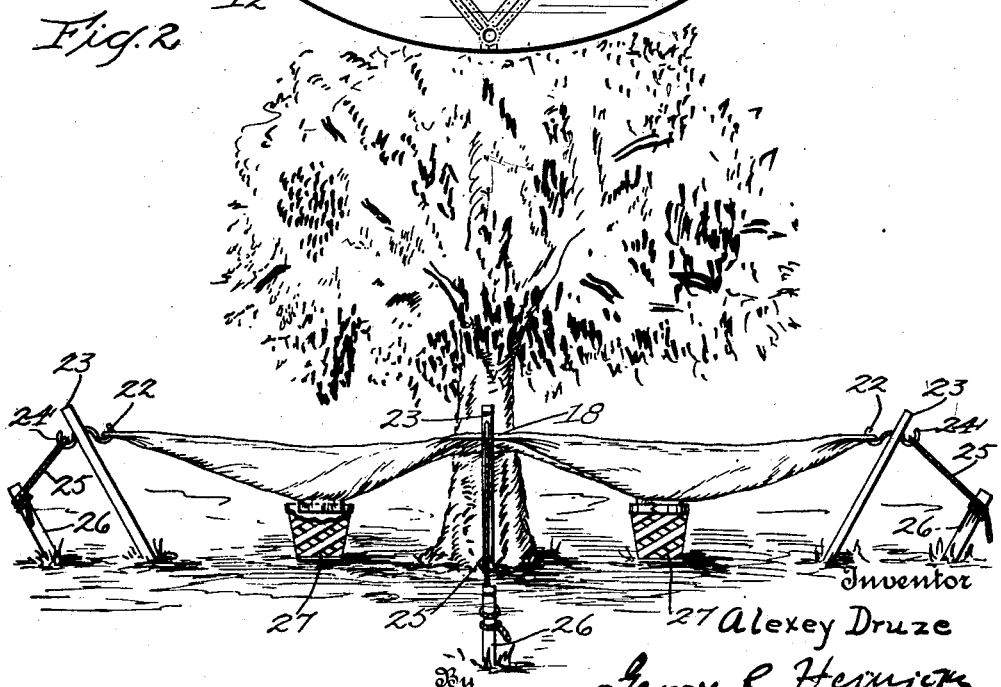

ALEXEY DRUZE, OF NEWARK, NEW JERSEY.

FRUIT-COLLECTOR.

1,361,029.
Specification of Letters Patent.
Patented Dec. 7, 1920.

Application filed March 17, 1920. Serial No. 366,531.

*To all whom it may concern:*

Be it known that I, ALEXEY DRUZE, a citizen of Russia, residing at Newark, county of Essex, and State of New Jersey, have invented certain new and useful Improvements in Fruit-Collectors, of which the following is a specification.

This invention relates to certain improvements in fruit and nut collectors or gatherers from trees or bushes, and it is the object to provide a device of this character which may in use be spread out and stretched beneath the tree or bush from which the fruits or nuts are to be gathered.

A further object of the invention is to provide a device of this character whereby the fruits or nuts when shaken or picked from a tree or bush, may be received and conveyed into baskets or other suitable receptacles without injury to the fruits.

A still further object of my invention is to provide a device which may be adapted to fit any tree or bush and which is readily assembled or removed and shifted from one tree or bush to another.

In order to accomplish these desired results the collector apron is divided from the center toward the sides so that it may be readily drawn around and tied to the trunk of a tree at a suitable height, while the periphery of the apron at oppositely disposed points can be supported to suitable means for holding the edges of the apron in an elevated position slightly above the plane of the central position so that a series of, for instance, four hoppers are formed into which the fruit dropping upon the apron is diverted by rolling down the inclined faces of the hoppers in order to be finally discharged through the openings into suitable receptacles underneath, provided for this purpose.

With these and other objects in view the invention is illustrated in the accompanying drawings, in which—

Figure 1 is a top plan view of a canvas apron constituting a vital part of my fruit and nut collector or gatherer, and Fig. 2 an elevation thereof mounted under a fruit tree.

The apron 10 of canvas or any other suitable material is preferably circular and is made in two parts 11 and 12 which are united at their meeting edges by strengthening strips 13, 14, the meeting edges of which are interlocked by laces 15, passing through suitable openings 16.

The apron 10 and strengthening strips 13 and 14 are formed so that their centers form an opening 17 for permitting a lacing of the apron around the trunk 18 of a tree.

In each of the canvas halves of the apron 10, a plurality of seams 19 are provided to form two hoppers 20 and 20'.

Near the outer periphery of each half-apron, holes 21 are provided which are suitably reinforced for the reception of hooks 22 secured to the upper ends of supports or poles 23 adapted to be driven into the ground. The outer faces of these poles are provided with similar hooks 24 oppositely disposed to the hooks 22, to which the inner ends of cables or ropes 25 are fastened the outer ends of which are secured to pegs 26 driven into the ground at a suitable distance from the poles 23.

Suitable baskets 27 or similar receptacles are placed underneath the hopper openings 20 and 20' for the reception of the fruits or nuts shaken or gathered from the tree or bush.

The operation of the device will be apparent from the foregoing description and while the illustration shows a preferred form of my invention, I do not desire to be limited to the exact construction shown, but desire to reserve my right to make changes such as are permissible without deviating from the spirit and scope of my invention.

Having thus described my invention what I claim as new and desire to secure by Letters Patent of the United States is as follows—

1. In a fruit and nut gatherer of the character described, the combination of a bipartite circular apron having openings in each part forming hoppers for the collection of the gathered fruits underneath said hoppers, means for connecting the two parts of said apron, seams in both parts, poles adapted to be driven into the ground, hooks on said poles engaging openings in the periphery of said apron, pegs adapted to be driven into the ground in proximity of said poles, and cables or ropes for engaging said pegs and hooks on said poles substantially as described.

2. In a fruit and nut gatherer of the character described, the combination of a bipartite circular apron, provided with reinforced holes near its periphery, a perforated strengthening strip at the meeting edges of said parts, laces passed through said perforations for uniting both parts, hoppers formed by seams, through which the gathered fruits are collected into receptacles, poles adapted to be driven into the ground, hooks on opposite sides of said poles, the hooks on the inner side of said poles adapted to engage the reinforced holes in the apron, for holding the periphery of the apron on a higher level than its central part, pegs adapted to be driven into the ground in proximity of said poles and ropes secured with one end to said pegs and with the other to the hooks on the rear of said poles, substantially as described and for the purpose set forth.

In testimony whereof I have affixed my signature.

ALEXEY DRUZE.